(12) United States Patent
Shen et al.

(10) Patent No.: US 9,003,338 B2
(45) Date of Patent: Apr. 7, 2015

(54) COMMON TEMPLATE FOR ELECTRONIC ARTICLE

(71) Applicant: Taiwan Semiconductor Manufacturing Company Limited, Hsin-Chu (TW)

(72) Inventors: William Wu Shen, Hsinchu (TW);
Yun-Han Lee, Baoshan Township (TW);
Chin-Chou Liu, Jhubei (TW);
Hsien-Hsin Lee, Duluth, GA (US);
Chung-Sheng Yuan, Hsinchu (TW);
Chao-Yang Yeh, Luzhou (TW);
Wei-Cheng Wu, Hsinchu (TW);
Ching-Fang Chen, Taichung (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 0 days.

(21) Appl. No.: 13/833,724

(22) Filed: Mar. 15, 2013

(65) Prior Publication Data
US 2014/0282305 A1    Sep. 18, 2014

(51) Int. Cl.
| G06F 17/50 | (2006.01) |
|---|---|
| G06F 19/00 | (2011.01) |
| G03F 1/00 | (2012.01) |
| G21K 5/00 | (2006.01) |

(52) U.S. Cl.
CPC ........ *G06F 17/5081* (2013.01); *G06F 2217/12* (2013.01); *G21K 5/00* (2013.01); *G06F 19/00* (2013.01); *G06F 17/5045* (2013.01); *G03F 1/144* (2013.01)

(58) Field of Classification Search
CPC . G03F 1/144; G03F 7/70475; G03F 17/5045; G03F 17/5081; G03F 2217/12; G03F 19/00; G21K 5/00

USPC .......... 716/100, 54, 55, 56, 52, 53, 119, 122, 716/123, 124, 125; 700/97, 120, 121; 430/5; 378/35
See application file for complete search history.

(56) References Cited

U.S. PATENT DOCUMENTS

| 4,343,878 | A | * | 8/1982 | Chiang | 430/5 |
|---|---|---|---|---|---|
| 6,013,536 | A | * | 1/2000 | Nowak et al. | 438/17 |
| 6,337,162 | B1 | * | 1/2002 | Irie | 430/5 |
| 7,316,871 | B2 | * | 1/2008 | You | 430/5 |
| 2002/0071112 | A1 | * | 6/2002 | Smith et al. | 356/124 |
| 2003/0118918 | A1 | * | 6/2003 | Ohta | 430/5 |
| 2003/0143496 | A1 | * | 7/2003 | Amemiya et al. | 430/394 |
| 2004/0019870 | A1 | * | 1/2004 | Ohmori | 716/19 |
| 2004/0233402 | A1 | * | 11/2004 | Smith | 355/52 |
| 2005/0142457 | A1 | * | 6/2005 | Lee | 430/5 |

(Continued)

*Primary Examiner* — Phallaka Kik
(74) *Attorney, Agent, or Firm* — Cooper Legal Group, LLC

(57) ABSTRACT

One or more techniques or systems for incorporating a common template into a system on chip (SOC) design are provided herein. For example, a common template mask set is generated based on a first set of polygon positions from a first vendor and a second set of polygon positions from a second vendor. A third party creates a third party SOC design using a set of design rules generated based on the common template mask set. The common template is fabricated based on the third party SOC design using the common template mask set. Because the common template is formed using the common template mask set and because the common template mask set is based on polygon positions from both the first vendor and the second vendor, a part can be connected to the SOC regardless of whether the part is sourced from the first vendor or the second vendor.

20 Claims, 8 Drawing Sheets

(56) References Cited

U.S. PATENT DOCUMENTS

| | | | |
|---|---|---|---|
| 2006/0109438 A1* | 5/2006 | Smith et al. | 355/52 |
| 2008/0160423 A1* | 7/2008 | Chen et al. | 430/5 |
| 2008/0301621 A1* | 12/2008 | Fukuhara et al. | 716/19 |
| 2009/0053622 A1* | 2/2009 | Lee | 430/5 |
| 2009/0075183 A1* | 3/2009 | Cecil | 430/5 |
| 2009/0077524 A1* | 3/2009 | Nagamura et al. | 716/19 |
| 2011/0083115 A1* | 4/2011 | Liu et al. | 716/118 |
| 2012/0053892 A1* | 3/2012 | Matsuoka et al. | 702/167 |
| 2012/0115291 A1* | 5/2012 | Fujita | 438/199 |
| 2013/0174106 A1* | 7/2013 | Hsu et al. | 716/55 |
| 2014/0078804 A1* | 3/2014 | Hsieh et al. | 365/63 |

* cited by examiner

COMMON TEMPLATE FOR ELECTRONIC ARTICLE

BACKGROUND

Generally, an electronic article such as a system on chip (SOC) is associated with an interface that enables the SOC to electrically connect with a part, such as a dynamic random access memory (DRAM). Routinely, however, there are multiple vendors available to provide the part, where the part varies somewhat from vendor to vendor such that the manner or mechanism for electrically connecting the part to the SOC varies depending upon the vendor chosen to supply the part. Accordingly, different interfaces are generally required to electrically connect the part to the SOC when different vendors are used. That is, a first interface is needed to electrically connect the part to the SOC when the part is obtained from a first vendor and a second interface is need to electrically connect the part to the SOC where the part is obtained from a second vendor. Generally, an interface comprises one or more sets of features. A mask of a set of masks is typically used to form, on the SOC, a set of features of the sets of features. For example, where vendor A is selected to provide DRAM A, a first set of masks 'A' comprising a first mask A, a second mask A, and a third mask A is used to form an interface A compatible with the DRAM A. The first mask A is used to form a first set of features A within the interface A, the second mask A is used to form a second set of features A within the interface A, and the third mask A is used to form a third set of features A within the interface A. When a switch is made from DRAM A to DRAM B provided by vendor B, a second set of masks 'B' comprising a first mask B, a second mask B, and a third mask B is required to fabricate interface B on the SOC such that the SOC is compatible with the DRAM B. The first mask B is used to form a first set of features B within the interface B, the second mask B is used to form a second set of features B within the interface B, and the third mask B is used to form a third set of features B within the interface B. It will be appreciated that the first set of masks 'A' is specific to vendor A and cannot be used to fabricate interface B. Similarly, the second set of masks 'B' is specific to vendor B and cannot be used to fabricate interface A.

SUMMARY

This summary is provided to introduce a selection of concepts in a simplified form that are further described below in the detailed description. This summary is not intended to be an extensive overview of the claimed subject matter, identify key factors or essential features of the claimed subject matter, nor is it intended to be used to limit the scope of the claimed subject matter.

One or more embodiments of techniques or systems for incorporating a common template into an electronic article design, such as a system on chip (SOC) design, are provided herein. It will be appreciated that while SOC and the like are substantially referred to herein, the instant application is not to be so limited. That is, the instant application, including the scope of the appended claims, is not necessarily limited to a SOC, a SOC design, etc. Rather, more than merely a SOC, a SOC design, etc. are within the contemplated scope of the present disclosure. Generally, a vendor specific interface is an interface that is formed on a SOC and that enables the SOC to mate or electrically connect with a part, such as a DRAM, from a particular vendor, where the vendor specific interface would not allow the SOC to electrically connect to the part if the part were obtained from a different vendor. The vendor specific interface is, for example, fabricated using a set of one or more masks and comprises one or more sets of corresponding features. According to some aspects provided herein, the SOC is designed such that at least a portion of the vendor specific interface fabricated on the SOC is standardized across one or more vendors. Because at least a portion of the vendor specific interface fabricated on the SOC is standardized across one or more vendors, the vendor specific interface is at time merely referred to as an interface, as opposed to a vendor specific interface.

The standardized portion of the interface is the same regardless of the vendor selected to provide the part, or rather is the same for at least two vendors. The standardized portion of the interface is standardized because a same set of masks is used to fabricate the standardized portion on the SOC. In some embodiments, the standardized portion of the interface is regarded as a common template. Similarly, the same set of masks used to fabricate the standardized portion on the SOC is regarded as a common template mask set. The common template mask set comprises one or more common template masks, where a common template mask is used to form a set of features of the common template. The common template meets design requirements for multiple vendors by comprising features, corresponding to polygon positions, for example, that allow the SOC to be electrically connected to the part regardless of the vendor that provided the part. It will be appreciated, however, that in some instances a vendor specific layer or set of features is required depending upon the vendor that is providing the part. The common template mask set similarly meets design requirements for multiple vendors by producing the features of the common template.

Given the common template mask set, or parameters thereof, a set of design rules is generated based on the common template mask set. The set of design rules is provided to a third party, such as a customer or any type of consuming entity interested in being able to connect a SOC to a part, such as DRAM. The third party generates a SOC design, and provided the third party complies with the set of design rules, the third party SOC design is compatible with the common template mask set. It will be appreciated that, where a mask set does not yet exist to establish an interface for a part from a particular vendor, the common template mask set obviates a requirement for a customer to produce such a mask set. It will be appreciated that this results in substantial savings where the customer desires to use the part from different vendors, and would thus otherwise be required to produce multiple mask sets, generally one per vendor from which the part is sourced. It will be appreciated that while vendor is substantially used herein that the instant application, including the scope of the appended claims, is not meant to be limited thereby. For example, vendor is to be synonymous with merely party, entity or the like.

The following description and annexed drawings set forth certain illustrative aspects and implementations. These are indicative of but a few of the various ways in which one or more aspects are employed. Other aspects, advantages, or novel features of the disclosure will become apparent from the following detailed description when considered in conjunction with the annexed drawings.

DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion.

DETAILED DESCRIPTION

Figure 1:
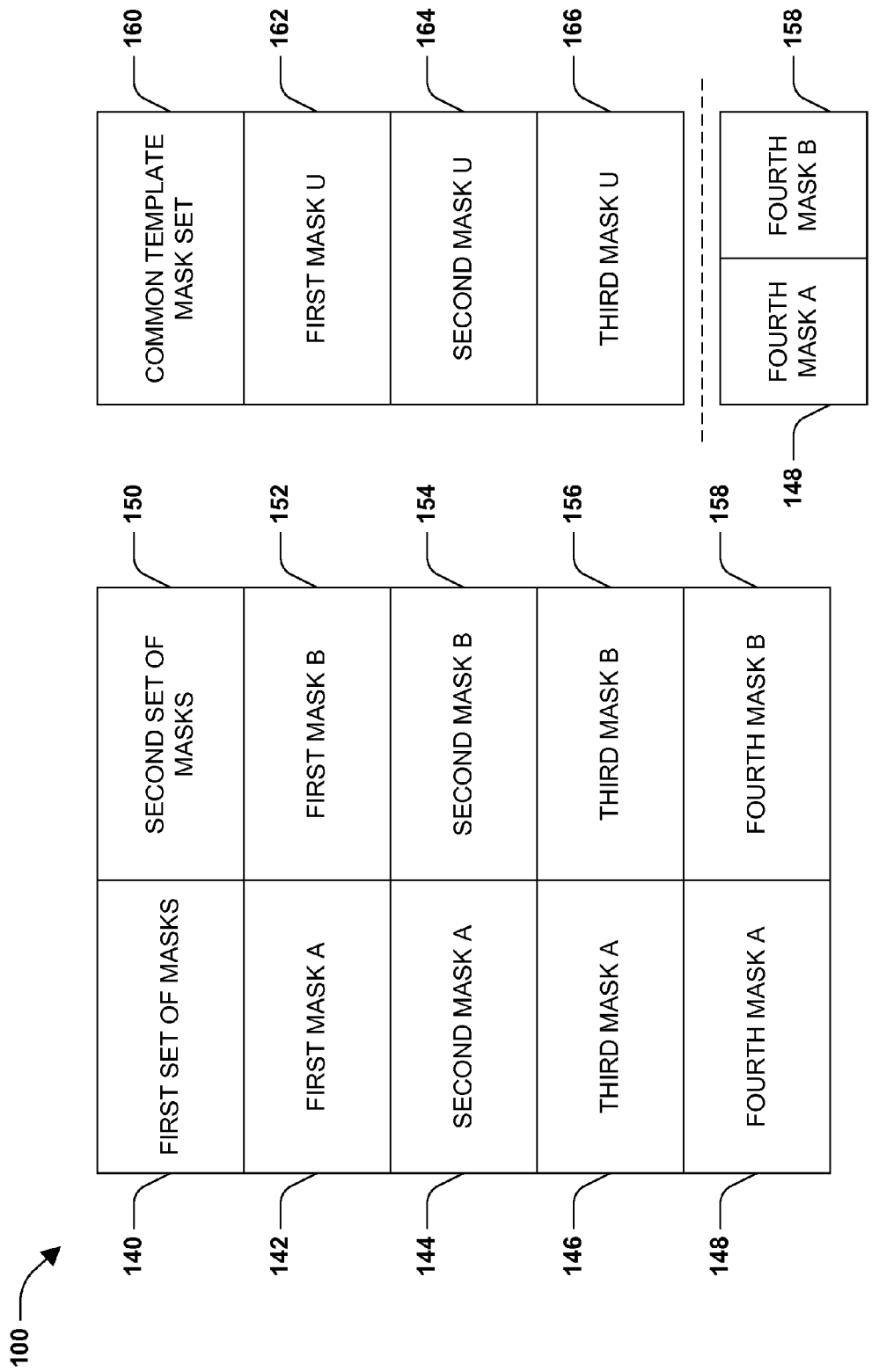
FIG. 1 is a table illustrating an example common template mask set for an electronic article, according to some embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

It will be appreciated that 'layer', as used herein, contemplates a region, and does not necessarily comprise a uniform thickness. For example, a layer is a region, such as an area comprising arbitrary boundaries. A layer is also, for example, a region comprising a variation in thickness.

Figure 2:
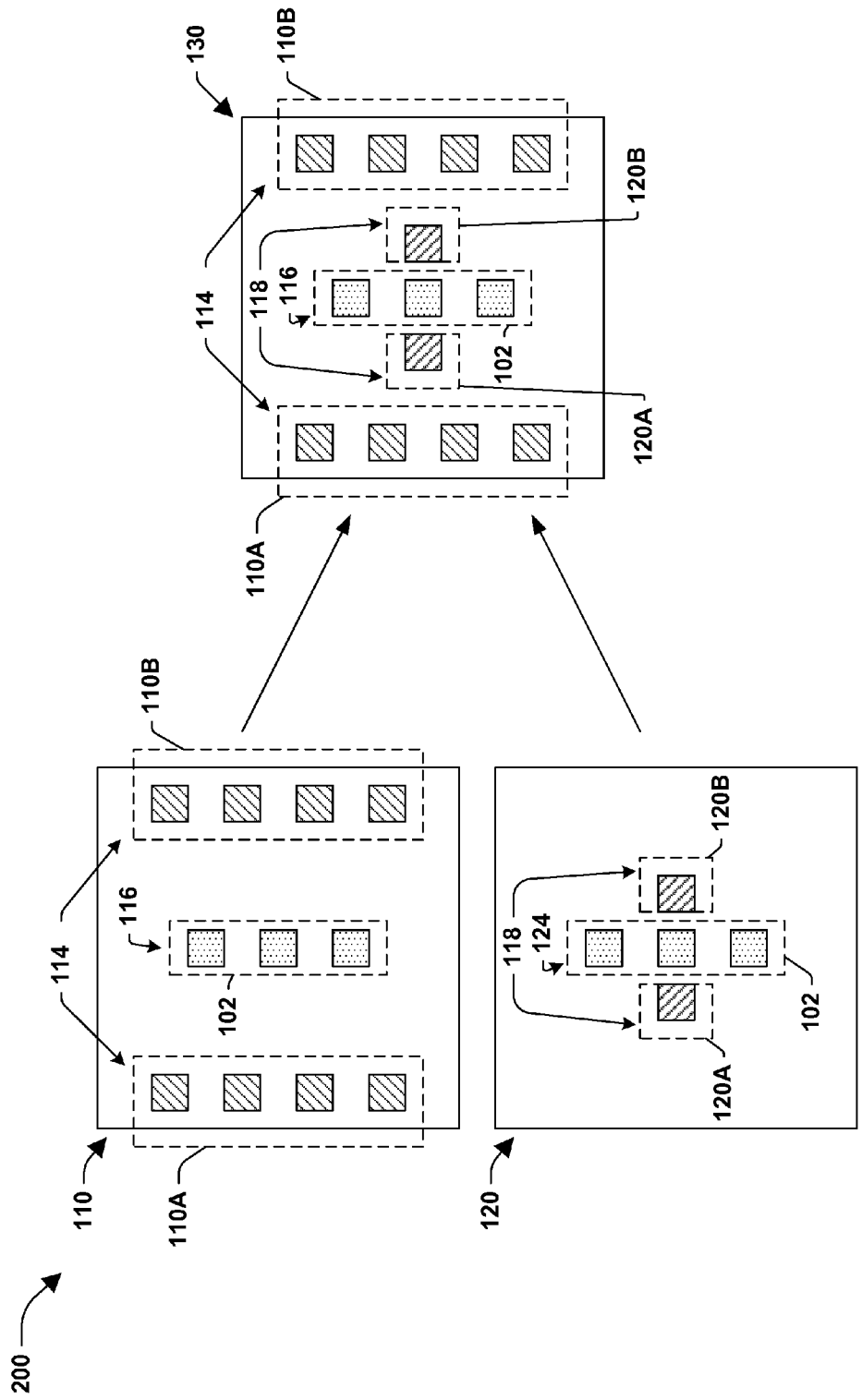
FIG. 2 is a layout view of an example common template mask for an electronic article, according to some embodiments.

It will be appreciated that for some of the figures herein, one or more boundaries, such as boundary 110A of FIG. 2, for example, are drawn with different heights, widths, perimeters, aspect ratios, etc. relative to one another merely for illustrative purposes, and are not necessarily drawn to scale. For example, because dashed or dotted lines are used to represent different boundaries, if the dashed and dotted lines were drawn on top of one another they would not be distinguishable in the figures, and thus are drawn with different dimensions or slightly apart from one another, in some of the figures, so that they are distinguishable from one another. As another example, where a boundary is associated with an irregular shape, the boundary, such as a box drawn with a dashed line, dotted lined, etc., does not necessarily encompass an entire component in some instances. Conversely, a drawn box does not necessarily encompass merely an associated component, in some instances, but encompasses at least a portion of one or more other components as well.

FIG. 1 is a table 100 illustrating an example common template mask set for an electronic article, such as a system on chip (SOC), according to some embodiments. Generally, a third party or any type of consuming entity formulates a SOC design and a first set of masks 140 is used to establish a first interface A (not shown) to connect the SOC to a first part from a first vendor, entity, party, etc. The first set of masks 140 is used to fabricate the first interface A comprising one or more sets of features on the SOC. The first interface A enables the SOC to electrically connect with the first part from the first vendor. As an example, the first set of masks 140 comprises a first mask A 142, a second mask A 144, a third mask A 146, and a fourth mask A 148. The first mask A 142 is used to form a first set of features A on the SOC. Similarly, the second mask A 144, the third mask A 146, and the fourth mask A 148 are used to form a second set of features A, a third set of features A, and a fourth set of features A on the SOC, respectively. Together, the first, second, third, and fourth set of features A form the first interface A on the SOC.

A second set of masks 150 are used to fabricate a second interface B (not shown) when a switch is made to a second part from a second vendor, entity, party, etc. It will be appreciated that the first part and the second part correspond to a same part, such as DRAM, for example, but where the first part is provided by the first vendor and the second part is provided by the second vendor. For example, the second set of masks 150 comprises a first mask B 152, a second mask B 154, a third mask B 156, and a fourth mask B 158. The first mask B 152, the second mask B 154, the third mask B 156, and the fourth mask B 158 are used to form a first set of features B, a second set of features B, a third set of features B, and a fourth set of features B on the SOC, respectively. It will be appreciated that the second set of masks 150 is specific to the second vendor and that the first set of masks 140 is specific to the first vendor.

In some embodiments, a common template mask set 160 comprises a first mask U 162, a second mask U 164, and a third mask U 166. The first mask U 162 is configured to form the first set of features A and the first set of features B on the SOC. Similarly, the second mask U 164 is configured to form the second set of features A and the second set of features B on the SOC. The third mask U 166 is configured to form the third set of features A and the third set of features B on the SOC. In other words, a 'U' mask is functionally equivalent to an 'A' mask counterpart and a 'B' mask counterpart, at least in part. For example, the first mask U 162 is functionally equivalent to the first mask A 142 and the first mask B 152. In some embodiments, a common template comprises the respective features formed by masks 162, 164, and 166. In other words, the common template comprises the first set of features A, the second set of features A, the third set of features A, the first set of features B, the second set of features B, and the third set of features B. Because masks 162, 164, and 166 of the common template mask set 160 are configured to form features similar to the features associated with masks 142, 152, 144, 154, 146, and 156, the common template mask set 160 is configured to fabricate a common template that is compatible with the first part from the first vendor and the second part from the second vendor. Because the first mask U 162, the second mask U 164, and the third mask U 166 provide features functionally equivalent to the first mask A 142, the first mask B 152, the second mask A 144, the second mask B 154, the third mask A 146, and the third mask B 156, the common template mask set 160 of FIG. 1 reduces a number of masks associated with interface fabrication.

A under bump metallization (UBM) mask is used to fabricate one or more vendor specific features on the SOC. For example, the fourth mask A 148 is used to fabricate a first set of UBM features on the SOC when the first vendor is selected. Similarly, the fourth mask B 158 is used to fabricate a second set of UBM features on the SOC when the second vendor is selected.

FIG. 2 is a layout view 200 of an example common template mask 130 for an electronic article, such as a system on chip (SOC), according to some embodiments. A common template mask is a combination of a first set of features associated with a first vendor part and a second set of features associated with a second vendor part. For example, 110 is a first set of polygon positions associated with a first vendor part from a first vendor, entity, party, etc. and 120 is a second set of polygon positions associated with a second vendor part from a second vendor, entity, party, etc. Effectively, the sets of polygon positions are design requirements from respective vendors, where polygon positions correspond, for example, to features to be formed in an interface. Generally, a set of polygon positions comprises one or more subsets of polygon positions. A subset of polygon positions comprises one or more patterns.

In the example illustrated in FIG. 2, the first set of polygon positions 110 comprises a first subset of polygon positions 114 and a second subset of polygon positions 116. The first subset of polygon positions 114 comprises pattern 110A and pattern 110B. The second subset of polygon positions 116 comprises pattern 102. The second set of polygon positions 120 comprises a third subset of polygon positions 118 and a fourth subset of polygon positions 124. The third subset of polygon positions 118 comprises pattern 120A and pattern 120B. The fourth subset of polygon positions 124 comprises pattern 102.

In some embodiments, the first set of polygon positions 110 is functionally equivalent to the second set of polygon positions 120. For example, one or more signals associated with the first set of polygon positions 110, or features ultimately fabricated at the first set of polygon positions 110, are the same as one or more signals associated with the second set of polygon positions 120, or features ultimately fabricated at the second set of polygon positions 120. Because the first set of polygon positions 110 comprises patterns 110A and 110B of the first subset 114 and the second set of polygon positions 120 does not comprise patterns 110A and 110B, the first subset 114 is exclusive to the first set of polygon positions 110. Similarly, because the second set of polygon positions 120 comprises patterns 120A and 120B of the third subset 118 and the first set of polygon positions 110 does not comprise patterns 120A and 120B, the third subset 118 is exclusive to the second set of polygon positions 120. Within the first set of polygon positions 110 and the second set of polygon positions 120, however, the second subset 116 and the fourth subset 124 do overlap. In an example, the overlap occurs because polygons of the second subset 116 and polygons of the fourth subset 124 are positioned according to a commonality, such as an industry standard, for example. While a commonality is not limited to an industry standard, an example industry standard is nevertheless a Joint Electron Devices Engineering Council (JEDEC) standard.

The common template mask 130 of FIG. 1 is generated based on the first set of polygon positions 110 and the second set of polygon positions 120, as illustrated by arrows pointing from 110 and 120 to 130. For example, the common template mask 130 comprises the first subset 114 of the first set of polygon positions 110, the third subset 118 of the second set of polygon positions 120, and the second subset 116 of the first set of polygon positions 110 or the fourth subset 124 of the second set of polygon positions. Explained in another way, the common template mask 130 is generated based on a superset or a union of the first set of polygon positions 110 and the second set of polygon positions 120. Because the second subset 116 and the fourth subset 124 share overlapping positions, the second subset 116 and the fourth subset 124 are merged in the common template mask 130, illustrated as 116. Since the common template mask 130 combines the first set of polygon positions 110 with the second set of polygon positions 120, the common template mask 130 facilitates formation of features that satisfy design requirements for both the first vendor and the second vendor. Because of this, the common template formed by the common template mask 130 is compatible with parts from both the first vendor and the second vendor. In this way, the common template mask 130 comprises a vendor neutral design with regard to the first vendor and the second vendor. It will be appreciated that separate masks associated with the first set of polygon positions 110, such as the first mask A 142 of FIG. 1, and the second set of polygon positions 120, such as the first mask B 152 of FIG. 1, are not required when using the common template mask 130. Accordingly, a number of masks associated with fabricating a SOC design, or an interface associated therewith, is mitigated. Accordingly, a number of manufacturing process variables associated with retooling for multiple masks is reduced as well.

Figure 3:
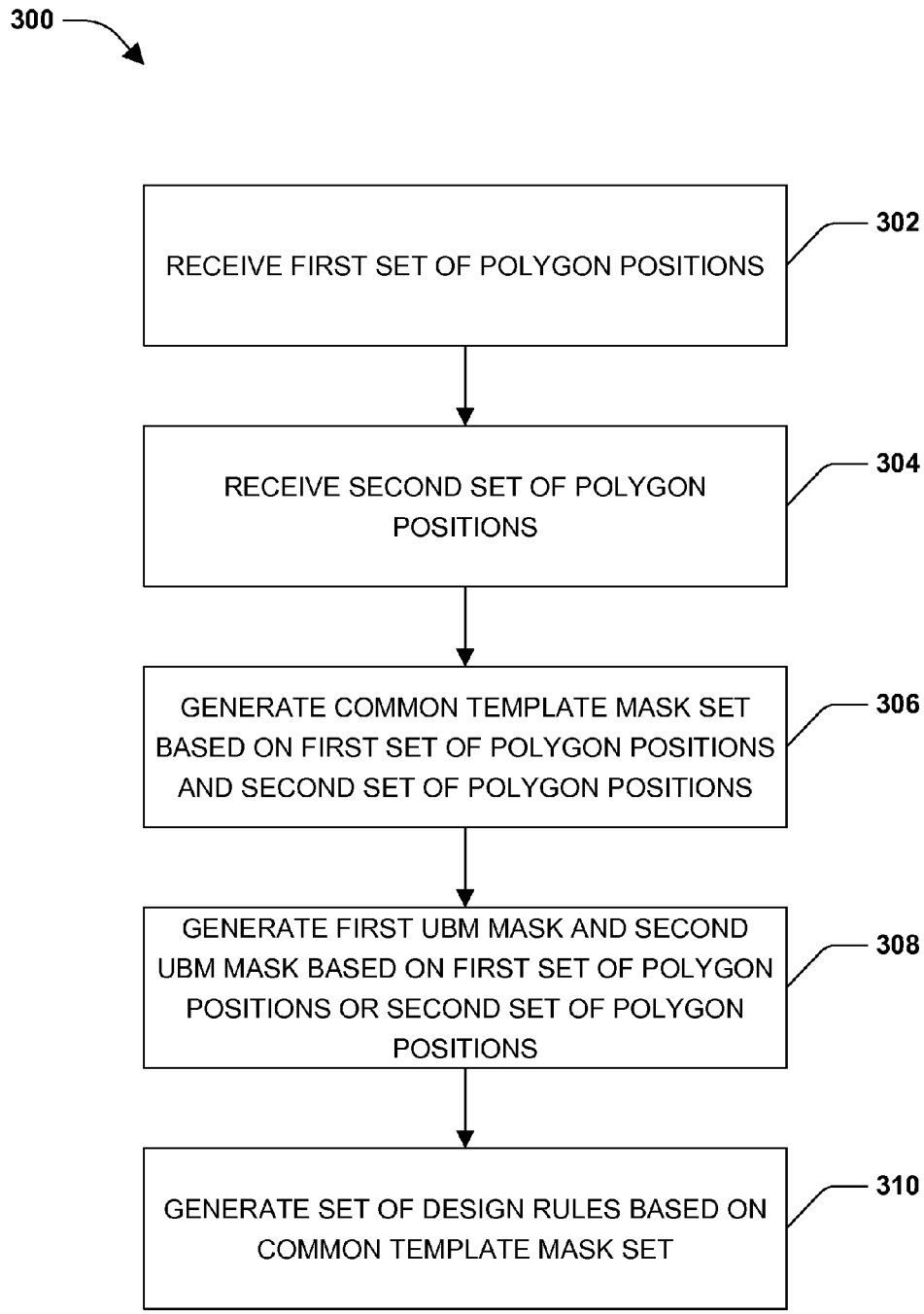
FIG. 3 is a flow diagram of an example method for incorporating a common template into an electronic article design, according to some embodiments.

FIG. 3 is a flow diagram of an example method 300 for incorporating a common template into an electronic article design, such as a system on chip (SOC) design, according to some embodiments. A common template mask set is generated from a superset of design requirements received from multiple vendors, entities, parties, party, etc. Design requirements are generally expressed as polygon positions for a mask, or rather features of an interface fabricated using the mask. At 302, a first set of polygon positions is received. The first set of polygon positions is a set of design requirements associated with a first part from a first vendor. At 304, a second set of polygon positions is received from a second vendor. The second set of polygon positions is a set of design requirements associated with a second part from a second vendor. At 306, a common template mask set comprising one or more common template masks is generated based on the first set of polygon positions and the second set of polygon positions. In some embodiments, a common template mask of the common template mask set is generated based on a superset or union of the first set of polygon positions and the second set of polygon positions. At a later stage, a common template mask of the common template mask set is used to fabricate a portion of a common template, such as a set of features on a SOC.

In some embodiments, one or more UBM masks are generated for the respective vendors. For example, in some instances, there are no common features among vendors and thus a vendor specific UBM mask is required for different vendors. Accordingly, at 308, a first under bump metallization (UBM) mask or a second UBM mask is generated based on the first set of polygon positions or the second set of polygon positions, respectively. At a later stage, a UBM mask is used to fabricate micro-bumps on a SOC. The micro-bumps enable the SOC to be electrically connected to a first part from a first vendor or a second part from a second vendor, for example.

At 310, a set of design rules is generated based on the common template mask set and provided to a third party, such as a customer. The set of design rules enables an SOC designer to create a design that can be fabricated utilizing the common template mask set. The set of design rules are indicative of suggested protocol to be followed during SOC design in order for the common template mask set to be used in conjunction with the SOC. For example, when a SOC or a SOC design in accordance with the set of design rules is received, the common template masks of the common template mask set are used to fabricate a common template on the SOC. Because the common template mask set is being used, the common template is compatible with the first part from the first vendor and the second part from the second vendor.

In some embodiments, a first design rule defines a position associated with an input-output (I/O) connection for the SOC. For example, an I/O connection is a micro-bump connection or a through silicon via (TSV) connection. A second design rule defines a number of I/O connections at a top layer of the SOC. Explained in another way, a design rule facilitates mating between a third party SOC and a common template mask of a common template mask set to fabricate a common template on the third party SOC. In other words, because the design rule is indicative of a suggested connection between third party logic of the third party SOC and an interface, such as a common template, a SOC designed according to the design rule enables one to fabricate the interface on the SOC using the common template mask set, rather than a custom mask set. It will be appreciated that some SOCs are fabricated active side up, while other SOCs are fabricated active side down, as will be described in FIG. 5 and FIG. 6, respectively. A third design rule associated with an active side up SOC design defines a position associated with a micro-bump for the SOC. A fourth design rule associated with an active side down SOC design defines a position associated with a through silicon via (TSV) for the SOC.

Figure 4:
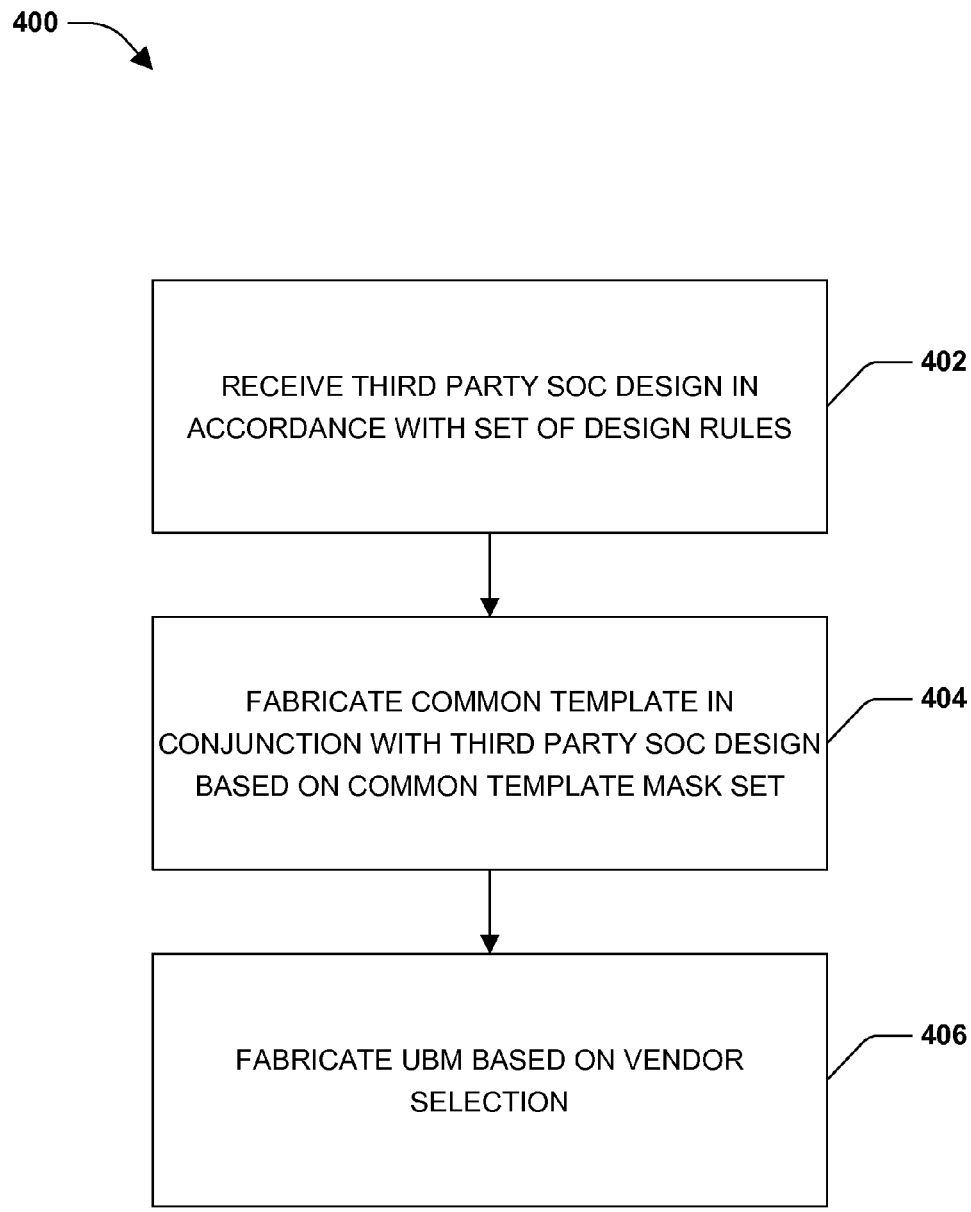
FIG. 4 is a flow diagram of an example method for incorporating a common template into an electronic article design, according to some embodiments.

FIG. 4 is a flow diagram of an example method 400 for incorporating a common template into an electronic article design, such as a system on chip (SOC) design, according to some embodiments. When a set of design rules generated based on a common template mask set is provided to a third party, the third party generates a third party SOC design in accordance with the set of design rules. In some embodiments, the third party SOC design that is in accordance with the set of design rules is received at 402. In some embodiments, a third party SOC is fabricated based on the third party SOC design at 402. In other embodiments, a fabricated third party SOC is received at 402. That is, rather than fabricating the SOC based upon the third part SOC design, the third party SOC is already fabricated, according to the third party SOC design, such as by a different entity, for example, and is merely received at 402.

Because the set of design rules is based on the common template mask set, a third party following the set of design rules is not required to develop a custom set of masks to fabricate an interface on the SOC. Thus, having a third party use design rules that are in conformance with a common template mask set allows the third party to generate a third party SOC design that can be satisfied by multiple vendors, without requiring multiple mask sets specific to each vendor.

During an intermediate fabrication stage at 404, a common template is fabricated on the third party SOC using the common template mask set. A third party SOC design often comprises a re-distribution layer (RDL) on a backside or a non-active region of the SOC. In some embodiments, the common template is fabricated on a backside of the third party SOC using the common template mask set. The common template mask set comprises one or more common template masks. For example, a common template mask of the common template mask set is configured to form a first set of features associated with a first part for a first vendor, such as a first set of features A associated with the first mask A 142 of FIG. 1, and a second set of features associated with a second part for a second vendor, such as the first set of features B associated with the first mask B 152 of FIG. 1. Together, the common template masks of the common template mask set form one or more sets of features associated with the first part from the first vendor and one or more sets of features associated with the second part from the second vendor. Effectively, the common template masks of the common template mask set form a common template that comprises the respective features. As discussed with regard to FIG. 2, a common template formed by a common template mask set comprising the common template mask 130 is compatible with a part from the first vendor as well when the part is sourced from the second vendor. In this way, the common template mask set is used to create a 'standard' interface on the SOC. In other words, the common template has a vendor neutral design.

At 406, a under bump metallization (UBM) layer is fabricated on the SOC based on a vendor selection of a part, such as DRAM, for the SOC. For example, the vendor selection comprises a first vendor selection or a second vendor selection. Up to this stage, the SOC, the common template fabricated on the SOC, and associated fabrication processing, such as common template masks used, have been vendor independent. For example, with reference to FIG. 1, the common template mask set 160 comprising the first mask U 162, the second mask U 164, and the third mask U 166 are used to fabricate a common template comprising sets of features associated with the first mask A 142, the second mask A 144, the third mask A 146, the first mask B 152, the second mask B 154, and the third mask B 156. The UBM layer, however, is vendor specific. In other words, the fourth mask A 148 is used to fabricate a first UBM layer when a part from the first vendor is selected, while the fourth mask B 158 is used to fabricate a second UBM layer when a part from a second vendor is selected. In some embodiments, the UBM layer comprises micro-bumps that are used to electrically connect the SOC to a part from a vendor. For example, if the first vendor is selected, the fourth mask A 148 is used to fabricate a first UBM layer comprising one or more micro-bumps that are configured to connect the SOC to the part from the first vendor. Similarly, if the second vendor is selected, the fourth mask B 158 is used to fabricate a second UBM layer comprising one or more micro-bumps that are configured to connect the SOC to the part from the second vendor. Explained in another way, when a part from a vendor is integrated into a SOC design, a UBM mask corresponding to the vendor is used to fabricate a UBM layer to connect the part from the vendor to the SOC.

In this way, merely a UBM mask, such as the fourth mask A 148 or the fourth mask B 158, is changed when a different vendor is selected to provide a part for a SOC. Because the common template mask set is compatible with parts from multiple vendors, vendor selection is not required at an earlier stage, such as fabrication of the common template. Since the common template mask set is adaptable to multiple vendors, no mask redesign is necessary for the common template when the third party changes a vendor selection. Further, if a third party switches vendors for a part, merely the UBM mask is changed, resulting in a reduced amount of re-tooling or setup when the third party changes vendors.

Figure 5:
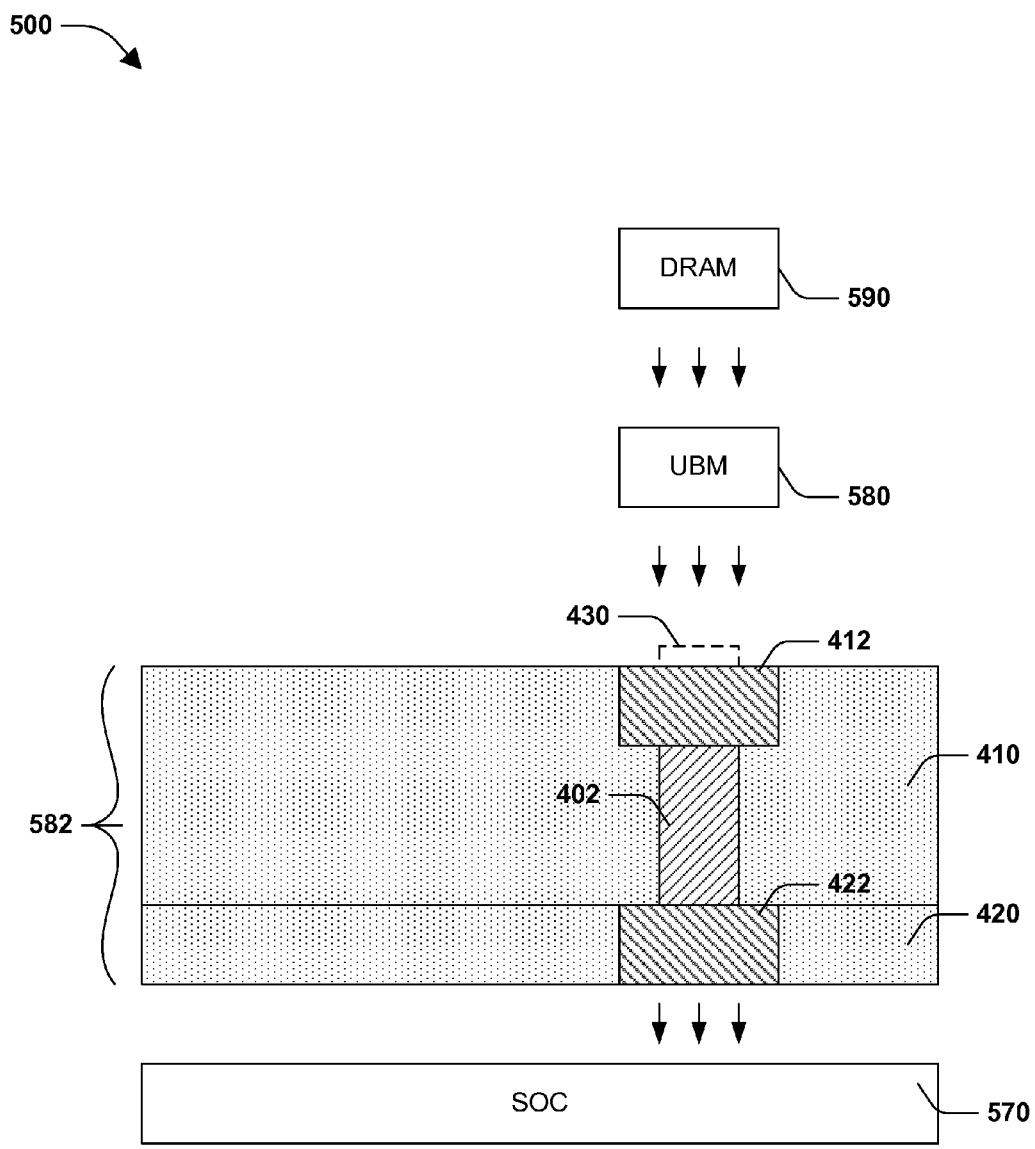
FIG. 5 is a cross-sectional view of a portion of an active side up electronic article design, according to some embodiments.

FIG. 5 is a cross-sectional view 500 of a portion of an active side up electronic article design, such as an active side up system on chip (SOC) design, according to some embodiments. A common template 582 is fabricated on the SOC 570 based on a common template mask set. In some embodiments, such as with an active side up SOC design, the common template 582 comprises a first dielectric region 410, a second dielectric region 420, a first metal region 412 within the first dielectric region 410, a second metal region 422 within the second dielectric region 420, and an interconnect 402. A design rule associated with a common template mask of the common template mask set defines a position associated with a micro-bump at 430. When a third party SOC design follows this design rule by positioning a micro-bump at this position, a common template mask set can be used to fabricate the common template 582 on the SOC 570. The common template 582 facilitates connecting the SOC 570 to a vendor part, such as DRAM 590 after a vendor specific UBM layer 580 is fabricated on the common template 582.

Figure 6:
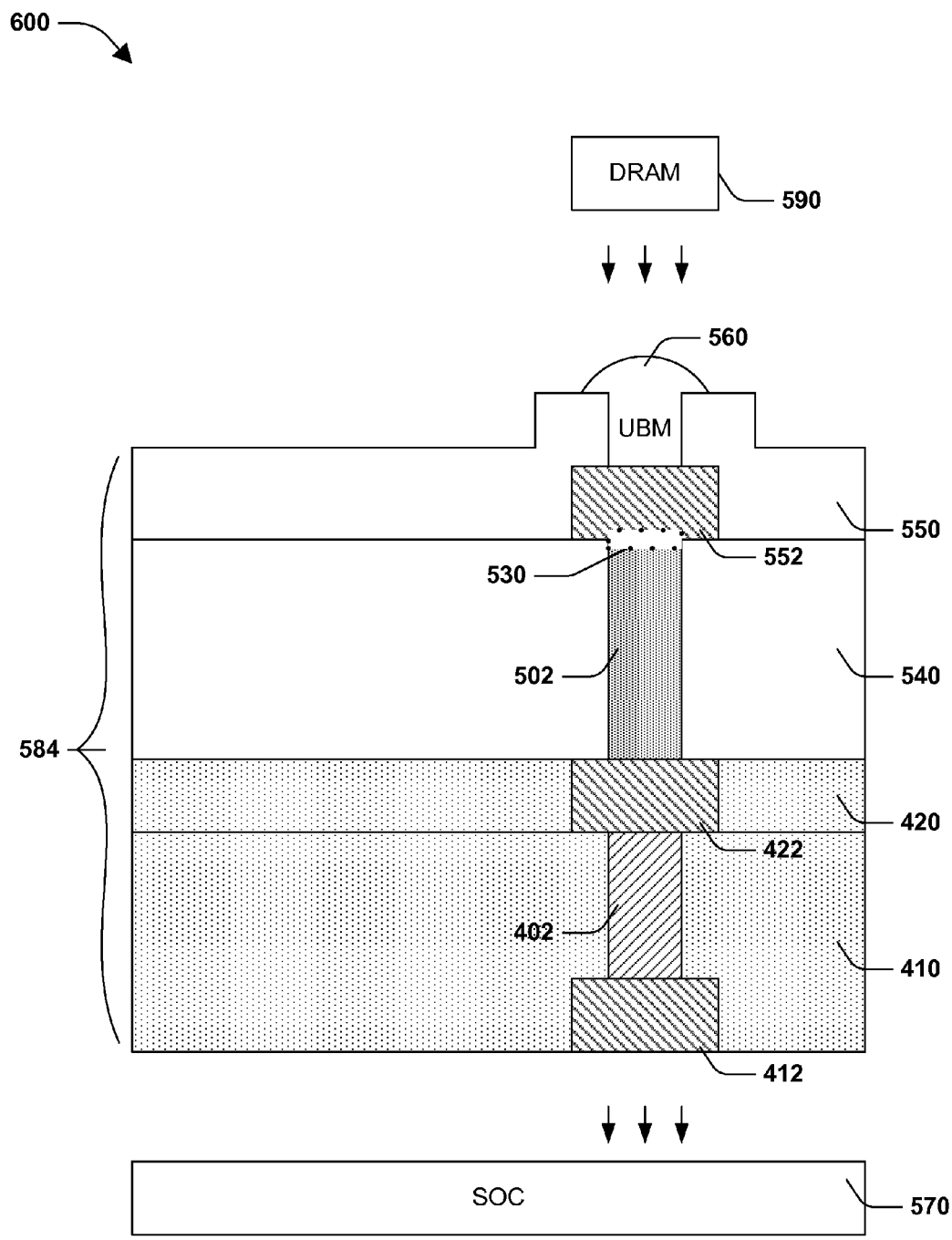
FIG. 6 is a cross-sectional view of a portion of an active side down electronic article design, according to some embodiments.

FIG. 6 is a cross-sectional view 600 of a portion of an active side down electronic article design, such as an active side down system on chip (SOC) design, according to some embodiments. A common template 584 is fabricated on the SOC 570 based on a common template mask set. The common template 584 comprises a first dielectric region 410, a second dielectric region 420, a first metal region 412 within the first dielectric region 410, a second metal region 422 within the second dielectric region 420, an interconnect 402, a silicon region 540, a through silicon via (TSV) 502, a passivation region 550, and a backside metal region 552. A design rule associated with a common template mask defines a position associated with the TSV at 530. When a third party SOC design follows this design rule by placing a TSV line at a predetermined or fixed position, such as at 530, a common template mask set can be used to fabricate the common template 584 on the SOC 570. The common template 584 connects the SOC 570 to a vendor part, such as DRAM 590 after a vendor specific UBM layer 560 is fabricated on the common template 584.

Figure 7:
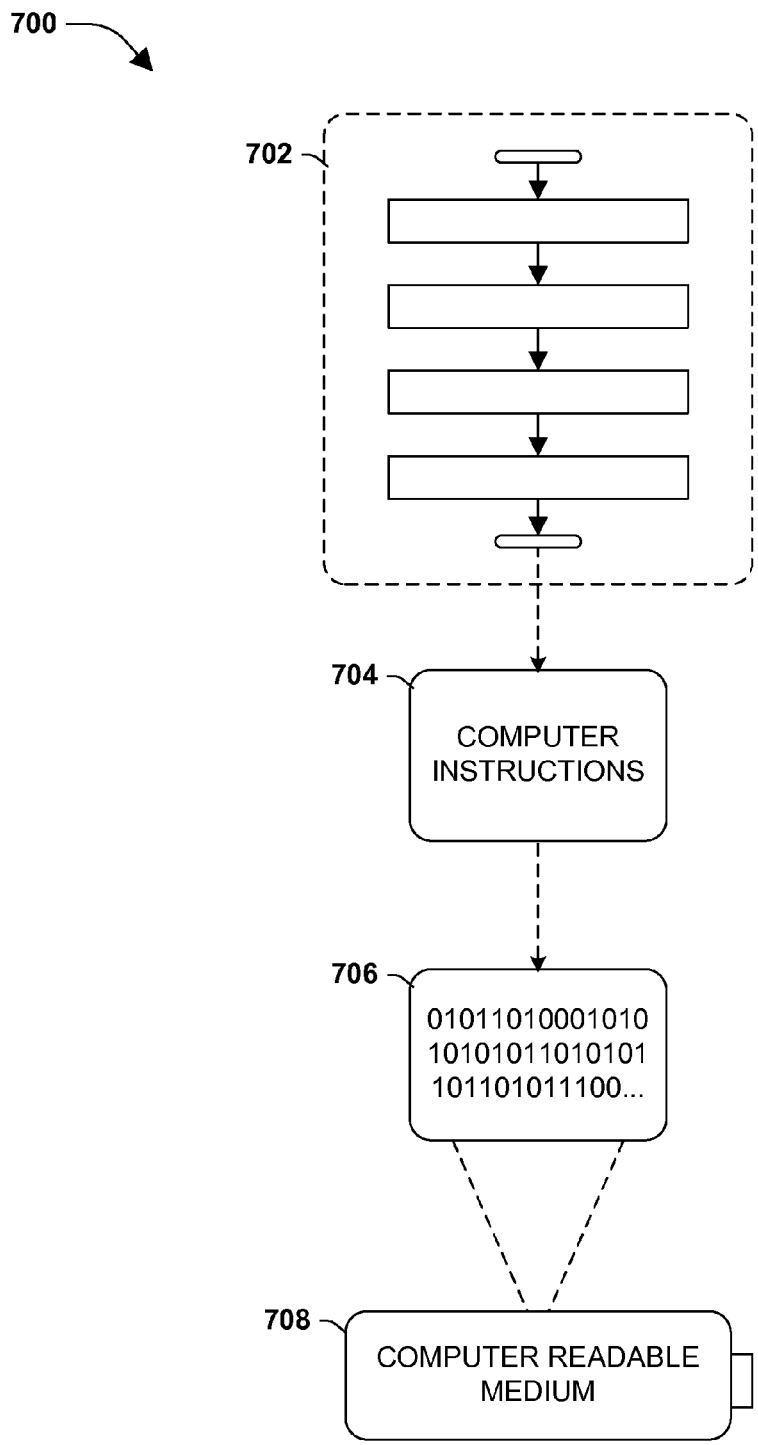
FIG. 7 is an illustration of an example computer-readable medium or computer-readable device comprising processor-executable instructions configured to embody one or more of the provisions set forth herein, according to some embodiments.

Still another embodiment involves a computer-readable medium comprising processor-executable instructions configured to implement one or more of the techniques presented herein. An example embodiment of a computer-readable medium or a computer-readable device is illustrated in FIG. 7, wherein an implementation 700 comprises a computer-readable medium 708, such as a CD-R, DVD-R, flash drive, a platter of a hard disk drive, etc., on which is encoded computer-readable data 706. This computer-readable data 706, such as binary data comprising a plurality of zero's and one's as shown in 706, in turn comprises a set of computer instructions 704 configured to operate according to one or more of the principles set forth herein. In one such embodiment 700, the processor-executable computer instructions 704 are configured to perform a method 702, such as at least some of the exemplary method 300 of FIG. 3 or at least some of exemplary method 400 of FIG. 4. In another embodiment, the processor-executable instructions 704 are configured to implement a system. Many such computer-readable media are devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
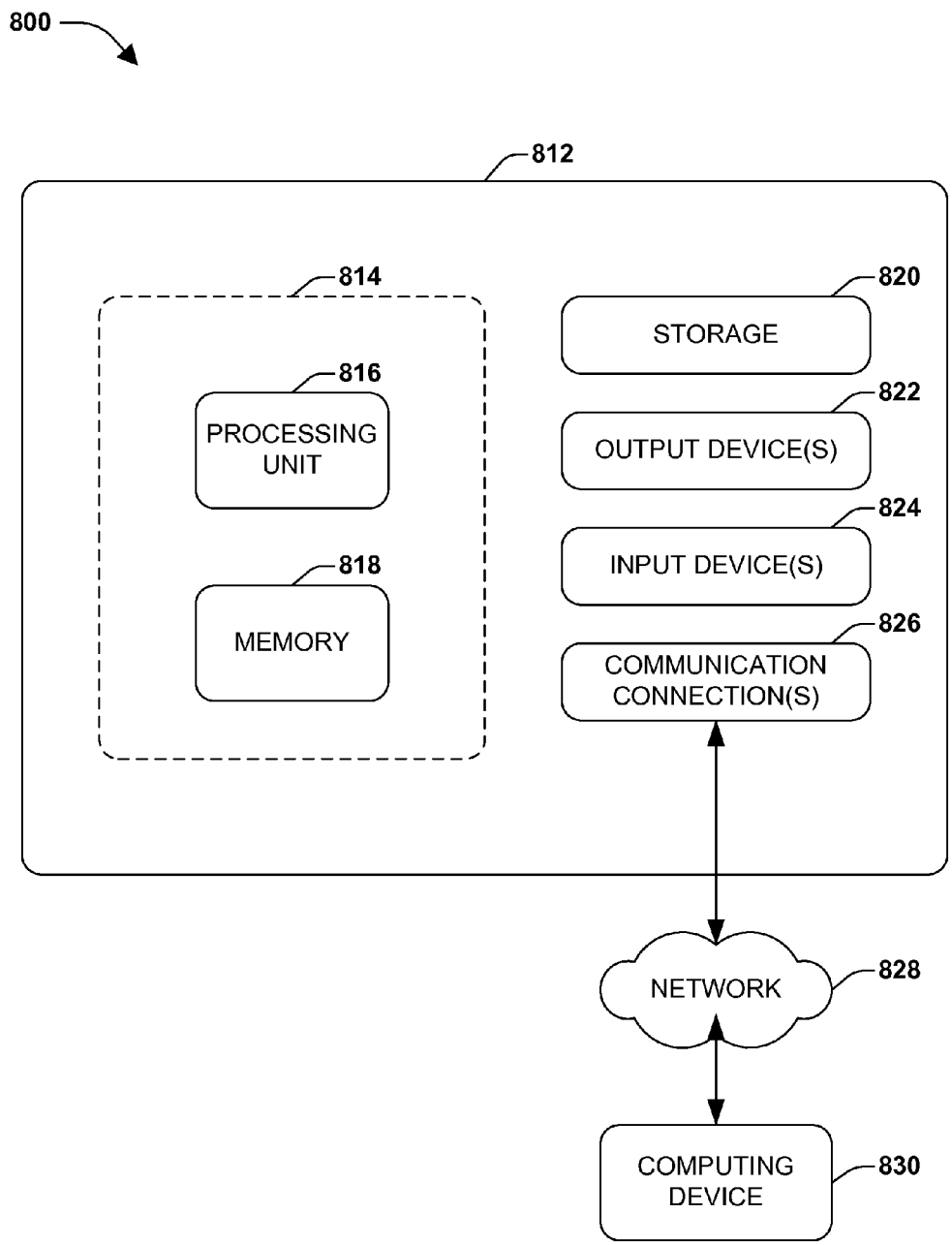
FIG. 8 is an illustration of an example computing environment where one or more of the provisions set forth herein are implemented, according to some embodiments.

FIG. 8 and the following discussion provide a description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions are implemented as program modules, such as functions, objects, Application Programming Interfaces (APIs), data structures, and the like, that perform particular tasks or implement particular abstract data types. Typically, the functionality of the computer readable instructions are combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or some combination of the two. This configuration is illustrated in FIG. 8 by dashed line 814.

In other embodiments, device 812 includes additional features or functionality. For example, device 812 also includes additional storage such as removable storage or non-removable storage, including, but not limited to, magnetic storage, optical storage, and the like. Such additional storage is illustrated in FIG. 8 by storage 820. In some embodiments, computer readable instructions to implement one or more embodiments provided herein are in storage 820. Storage 820 also stores other computer readable instructions to implement an operating system, an application program, and the like. Computer readable instructions are loaded in memory 818 for execution by processing unit 816.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media is part of device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 812 includes input device(s) 824 such as keyboard, mouse, pen, voice input device, touch input device, infrared cameras, video input devices, or any other input device. Output device(s) 822 such as one or more displays, speakers, printers, or any other output device are also included in device 812. Input device(s) 824 and output device(s) 822 are connected to device 812 via a wired connection, wireless connection, or any combination thereof. In some embodiments, an input device or an output device from another computing device are used as input device(s) 824 or output device(s) 822 for computing device 812. Device 812 also includes communication connection(s) 826 to facilitate communications with one or more other devices.

According to some aspects, a method for incorporating a common template into a system on chip (SOC) design is provided, comprising receiving a first set of polygon positions from a first vendor. Additionally, the method comprises receiving a second set of polygon positions from a second vendor. The method comprises generating a common template mask set based on the first set of polygon positions and the second set of polygon positions. The method comprises generating a first under bump metallization (UBM) mask for the first vendor or a second UBM mask for the second vendor based on the first set of polygon positions or the second set of polygon positions. The method comprises generating a set of design rules based on the common template mask set, a first design rule defining a position associated with an input-output (I/O) connection for a system on chip (SOC).

According to some aspects, a method for incorporating a common template into a system on chip (SOC) design is provided, comprising receiving a third party system on chip (SOC) design that is in accordance with a set of design rules based on a common template mask set. Additionally, the method comprises fabricating a common template in conjunction with the third party SOC design based on the common template mask set.

According to some aspects, common template mask for a system on chip (SOC) is provided, comprising a first pattern, a second pattern, and a third pattern. For example, the first pattern is associated with a first subset of a first set of polygon positions from a first vendor. For example, the second pattern is associated with a first subset of a second set of polygon positions from a second vendor. For example, the third pattern is associated with a second subset of the first set of polygon positions from the first vendor that overlaps with a second subset of the second set of polygon positions from the second vendor.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing the claims.

Various operations of embodiments are provided herein. The order in which some or all of the operations are described should not be construed as to imply that these operations are necessarily order dependent. Alternative ordering will be appreciated based on this description. Further, it will be understood that not all operations are necessarily present in each embodiment provided herein.

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or identical channels.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Also, although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method for incorporating a common template into an electronic article design, comprising:
    receiving a first set of polygon positions from a first party;
    receiving a second set of polygon positions from a second party;
    generating a common template mask set based on the first set of polygon positions and the second set of polygon positions;
    generating a first under bump metallization (UBM) mask for the first party or a second UBM mask for the second party based on the first set of polygon positions or the second set of polygon positions; and
    generating a set of design rules based on the common template mask set, a first design rule of the set of design rules defining a position associated with an input-output (I/O) connection for an electronic article, at least some of the generating are performed by a processing unit.

2. The method of claim 1, comprising generating the common template mask set based on a commonality.

3. The method of claim 1, comprising generating the common template mask set based on a superset of the first set of polygon positions and the second set of polygon positions.

4. The method of claim 1, a second design rule of the set of design rules defining a number of I/O connections at a top layer of the electronic article.

5. The method of claim 1, a third design rule of the set of design rules associated with an active side up electronic article design, the third design rule defining a second position associated with a micro-bump for the electronic article.

6. The method of claim 1, a fourth design rule of the set of design rules associated with an active side down electronic article design, the fourth design rule defining a second position associated with a through silicon via (TSV) for the electronic article.

7. The method of claim 1, comprising:
    providing the set of design rules to a consuming entity; and
    receiving a consuming entity electronic article design that is in accordance with the set of design rules.

8. The method of claim 7, comprising fabricating a consuming entity electronic article based on the consuming entity electronic article design.

9. The method of claim 8, comprising using a common template mask of the common template mask set when fabricating the consuming entity electronic article.

10. The method of claim 1, comprising receiving a party selection comprising a first party selection selecting the first party or a second party selection selecting the second party.

11. The method of claim 10, comprising fabricating a first UBM layer or a second UBM layer based on the party selection, the first UBM mask, or the second UBM mask.

12. A method for incorporating a common template into an electronic article design, comprising:
receiving a consuming entity electronic article design that is in accordance with a set of design rules based on a common template mask defining a placement of a first set of polygons that interface with a first part from a first vendor and a placement of a second set of polygons that interface with a second part from a second vendor; and
fabricating a common template in conjunction with the consuming entity electronic article design based on the common template mask, at least some of the method implemented at least in part via a processing unit.

13. The method of claim 12, the first set of polygons forming a first specific interface.

14. The method of claim 12, the second set of polygons forming a second specific interface.

15. The method of claim 12, comprising generating the common template mask based on a first set of polygon positions corresponding to the first set of polygons and a second set of polygon positions corresponding to the second set of polygons.

16. The method of claim 15, comprising generating the common template mask based on a superset of the first set of polygon positions and the second set of polygon positions.

17. The method of claim 12, comprising generating the set of design rules based on a common template mask set comprising the common template mask.

18. The method of claim 12, comprising generating a first design rule of the set of design rules, the first design rule defining a position associated with an input-output (I/O) connection for an electronic article corresponding to the electronic article design.

19. The method of claim 12, comprising providing the set of design rules to a consuming entity.

20. A common template mask for an electronic article, comprising:
a first pattern associated with a first subset of a first set of polygon positions from a first party;
a second pattern associated with a first subset of a second set of polygon positions from a second party; and
a third pattern associated with a second subset of the first set of polygon positions from the first party that overlaps with a second subset of the second set of polygon positions from the second party.

* * * * *